United States Patent
Bitar et al.

(10) Patent No.: US 7,362,710 B2
(45) Date of Patent: Apr. 22, 2008

(54) ORGANIZATION AND MAINTENANCE LOOPBACK CELL PROCESSING IN ATM NETWORKS

(75) Inventors: Nabil N. Bitar, Winchester, MA (US); Owen C. McNally, Nashua, NH (US); Suresh Sathyanarayana, Nashua, NH (US)

(73) Assignee: Lucent Technologies Inc., Murray Hill, NJ (US)

(*) Notice: Subject to any disclaimer, the term of this patent is extended or adjusted under 35 U.S.C. 154(b) by 739 days.

(21) Appl. No.: 10/838,927

(22) Filed: May 3, 2004

(65) Prior Publication Data

US 2005/0243732 A1 Nov. 3, 2005

(51) Int. Cl.
*H04J 1/16* (2006.01)

(52) U.S. Cl. ............... 370/241; 370/241.1; 370/249; 370/397; 370/395.1

(58) Field of Classification Search ............ 370/241.1, 370/224, 242, 247, 248, 249, 250, 252, 253, 370/254, 236.1, 236.2, 397, 395.1, 395.2, 370/395.3, 395.6, 409, 241
See application file for complete search history.

(56) References Cited

U.S. PATENT DOCUMENTS

| | | | |
|---|---|---|---|
| 5,633,869 A | 5/1997 | Burnett et al. | |
| 5,818,842 A | 10/1998 | Burwell et al. | |
| 5,852,601 A | 12/1998 | Newman et al. | |
| 5,999,518 A | 12/1999 | Nattkemper et al. | |
| 6,597,689 B1 | 7/2003 | Chiu et al. | |
| 6,647,208 B1 | 11/2003 | Kirby | |
| 6,650,646 B1 | 11/2003 | Galway et al. | |
| 6,865,158 B2* | 3/2005 | Iwamoto | 370/248 |
| 7,088,682 B1* | 8/2006 | Bangolae et al. | 370/249 |

OTHER PUBLICATIONS

CCITT (International Telegraph and Telephone Consultative Committee), "Principles for the Management of ISDNs," Oct. 1992, cover page, foreword, and pp. 1-20.
Peterson et al., "Computer Networks: A Systems Approach," 1996, cover page, copyright page, and pp. 177-188.
Tekelec, "ATM Pocket Guide," 1997, 2 cover pages, pp. 1-12.

(Continued)

*Primary Examiner*—Chi Pham
*Assistant Examiner*—Alexander O. Boakye

(57) ABSTRACT

A communication system comprising a plurality of sources, a plurality of destinations, and a plurality of switches forming an asynchronous transfer mode (ATM) network connecting the sources to the destinations. Each switch in the plurality of switches includes a plurality of line cards. The ATM network comprises a plurality of connections where, for each respective connection, one of the plurality of sources is linked to one of the plurality of destinations through the network by linking one or more switches, in the plurality of switches, that is associated with the respective connection. The ATM network further comprises operation administration and maintenance (OAM) cell processing circuitry for detecting a failure in a connection in the network. The failure is localized to the exact line card in a switch associated with the connection that is causing the connection to fail. The OAM cell processing circuitry detects the failure of the connection without use of the line card control blocks in the various line cards in the data path of the failed connection.

18 Claims, 14 Drawing Sheets

OTHER PUBLICATIONS

Decasper et al., "A Scalable, High Performance Active Network Node," Oct. 1998, pp. 1-19.

ITU-T (Telecommunication Standardization Sector of ITU) 1.610, "B-ISDN operation and maintenance principles and functions," Feb. 1999, 2 cover pages, pp. i-v, 1-78.

The ATM Forum Technical Committee, "Traffic Management Specification Version 4.1," Mar. 1999, pp. i-viii, 1-119.

Cisco Systems, Inc., "ATM Cell Structures," Sep. 30, 2002, 6 pages, downloaded from www.cisco.com on Mar. 9, 2004.

Weiss, "Backplane Switch-Fabric ICs Go To The Next Level," Electronic Design, Mar. 18, 2002, pp. 51-56.

* cited by examiner

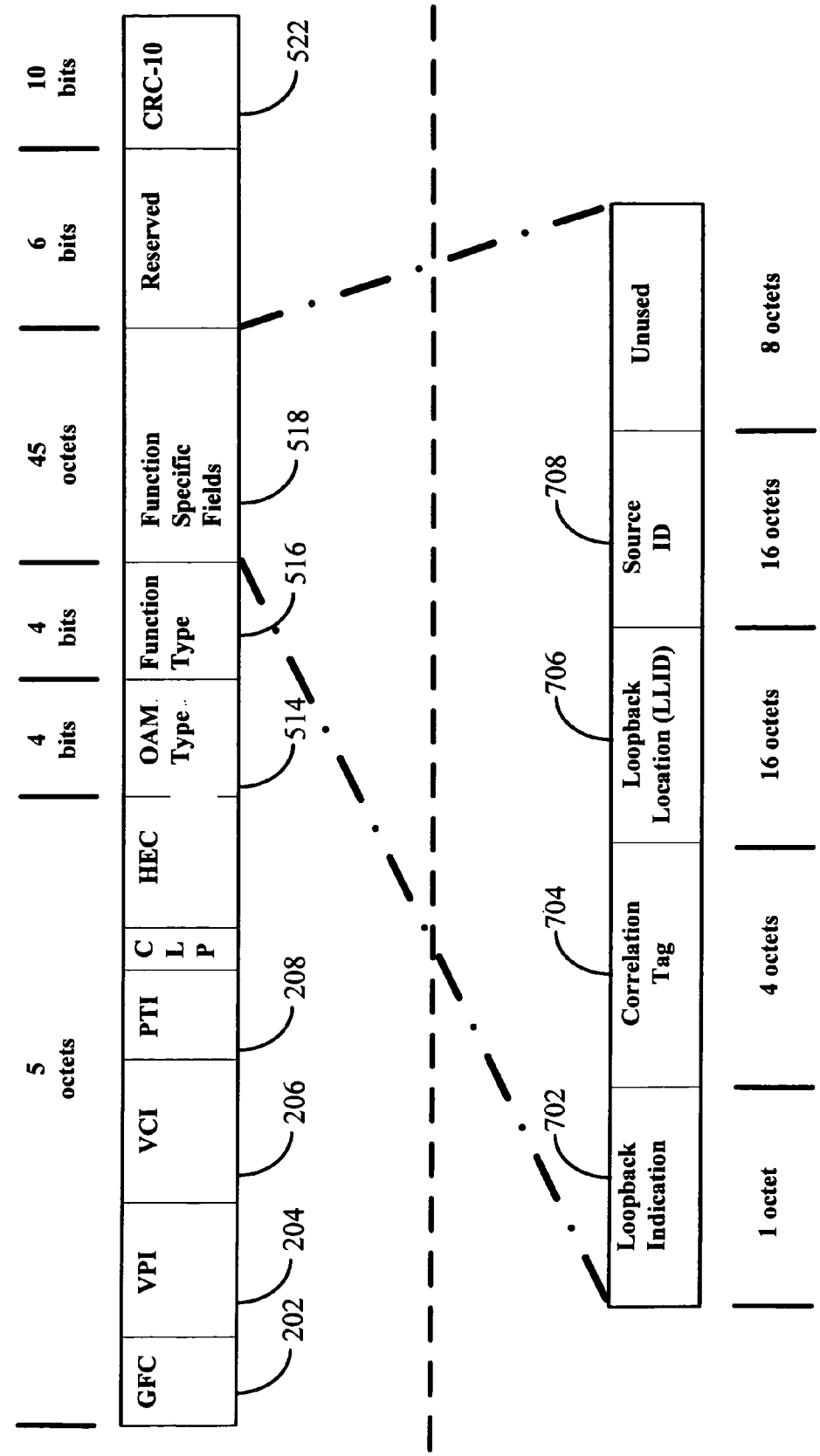

| | |
|---|---|
| Local_Endpoint_Indication (LEP) (1 for yes, 0 for no) | ~1102 |
| Remote_Endpoint_Indication (REP) (1 for yes, 0 for no) | ~1104 |
| Local_Segment_Sink_Indication (LSS) (1 for yes, 0 for no) | ~1106 |
| Local_Segment_Source_Indication (LSSC) (1 for yes, 0 for no) | ~1108 |
| Remote_Segment_Sink_Indication (RSSC) (1 for yes, 0 for no) | ~1110 |
| Remote_Segment_Source_Indication (RSS) (1 for yes, 0 for no) | ~1112 |
| OAM_Enable_Bit (1 for yes, 0 for no) | |
| LLID_Option (1 for yes, 0 for no). | ~1116 |
| Local_Egress_Connection_ID (Local ecid): used for address translation on egress toward network. This is the connection ID for the circuit in the egress direction of the ingress card. | ~1118 |
| Local_Capture_Bit (1 yes, 0 no) | ~1120 |
| Remote_Capture_Bit (1 yes, 0 no) | ~1122 |
| Source_Option_Enabled (1 yes, 0 no) | ~1124 |

ORGANIZATION AND MAINTENANCE LOOPBACK CELL PROCESSING IN ATM NETWORKS

FIELD OF INVENTION

The present invention relates to communication systems using connections, as in Asynchronous Transfer Mode (ATM) networks, to transport data units. In particular, this invention relates to the processing of Operation Administration and Maintenance (OAM) loopback cells to detect failures in the data paths of connections or round-trip delay.

BACKGROUND OF INVENTION

Referring to FIG. 1, network communication systems interconnect many users 102 in a network 100. Each user is connected to the network at a port. The network is formed by the interconnection of many nodes where information input at an input port from one user at a source (e.g., 102-1) is passed from node to node (e.g., node 106) through the network 100 to an output port and to another user at a destination (102-N). The information transferred from source to destination is packetized and each node switches incoming packets at incoming ports to outgoing packets at outgoing ports. For ATM networks, the packets are further divided into ATM cells or are natively ATM cells.

Fast packet switches can transfer hundreds of thousands or millions of packets per second at every switch port. Switch sizes range from a few ports to thousands of ports. The term "fast packet switch" includes switches capable of handling both variable length packets and fixed length packets. Fixed length packets are desirable since they simplify switch design. Switches that support the asynchronous transfer mode (ATM), referred to herein as ATM switches, use short, fixed-length packets (cells). ATM switches handle different types of communications services in a single integrated network where such services may include voice, video and data communications. Since voice and video services can tolerate only a limited amount of delay and delay variance through a network, ATM switches are suitable for such services.

Referring to FIG. 2, the ATM standard defines a cell having a size of 53 bytes with a 5 byte header and a 48 byte payload. ATM uses a 24-bit identifier for virtual channels on User-Network Interfaces (UNIs) and 28-bit identifier on Network Network Interfaces (NNIs) However, in the UNI case shown in FIG. 2 the 24-bit identifier is split into two parts: an 8-bit Virtual Path Identifier (VPI) 204 and a 16-bit Virtual Channel Identifier (VCI) 206. This provides some hierarchy in the identifier.

Referring to FIG. 9, cells are processed within the nodes of a network. Each node is an ATM switch that includes one or more ingress line cards, a switch fabric (SF) 904, and one or more egress line cards. An ingress line card is a line card 902 that receives ATM cells relative to the data flow connection whereas an egress line card is a line card 902 that transmits ATM cells relative to the data flow direction. The switch fabric enables the switching of traffic from card to card.

The input sequence of cells in a virtual channel is preserved across switch fabric 904 so that the output sequence of cells on each virtual channel is the same as the input sequence. Cells contain a virtual channel identifier VCI 206 in the cell header that along with VPI 204 identifies the connection to which the cell belongs. Each incoming VPI/VCI identifier 204/206 in the header of each cell is translated in an input controller to a connection identifier that is in turn used to identify the outgoing VPI/VCI on the egress line card. This translation is performed in the input controller typically by table look-up using the incoming VPI/VCI identifier to address a connection table. This connection table also contains a routing field to specify the output port of the switch fabric 904 to which the connection is routed. Other information can be included in the connection table on a per connection basis such as the priority, class of service, and traffic type of the connection.

In an ATM switch, cell arrivals are not scheduled. In a typical operation, a number of cells can arrive simultaneously at different input ports each requesting the same output port. Operations in which requests exceeding the output capacity of the output port are referred to as output contention (or conflict). Since an output port can only transmit a fixed number of cells at a time, for example one, cell at a time, only the fixed number of cells can be accepted for transmission so that any other cells routed to that port must either be discarded or must be buffered in a queue.

Switches 904 have two principle designs, time-division and space division. In a time-division switch fabric, all cells flow through a single communication channel shared in common by all input and output ports. In a space division switch, a plurality of paths are provided between the input and output ports. These paths operate concurrently so that many cells can be transmitted across the switch fabric at the same time. The total capacity of the switch fabric 904 is thus the product of the bandwidth of each path and the number of paths that can transmit a cell concurrently.

When the traffic load exceeds the available system resources in a network, congestion is present and performance degrades. When the number of cells is within the carrying capacity of the network, all cells can be delivered so that the number of cells delivered equals the number of cells sent without congestion. However, if cell traffic is increased to the level that nodes cannot handle the traffic, congestion results.

Congestion can be brought about by several factors. If nodes in a network are too slow to perform the various tasks required of them (queuing buffers, updating tables, etc.), queues build up, even though excess line capacity exists. On the other hand, even if nodes are very fast, queues will build up whenever the input traffic rate exceeds the capacity of the output traffic rate for any particular group of outputs.

If a node has no free buffers for queuing cells, the node must discard newly arriving cells. For packet data traffic, when a cell is discarded, the packet from which the discarded cell came may be retransmitted, perhaps many times, further aggravating the congestion.

Because of congestion and other failures in a network system, specialized Operation and Maintenance (OAM) cells, termed loopback OAM cells (end-end and segment loopback OAM cells), are used in ATM networks to see which nodes in the network are passing cells properly. See, for example, the loopback techniques disclosed in the ITU-T Recommendation I.610, Series I: Integrated Services Digital Network Maintenance Principles, "B-ISDN operation and maintenance principles and functions," February 1999, Appendix III.

Loopback OAM cells are usually initiated from a point in the connection to another point. The initiator of the OAM flow in an ATM network is called the source. The ultimate destination of an OAM cell that is traveling away from the source is called the loopback point. In other words, the loopback point is the node in a network where an OAM cell stops, turns around, and starts traveling back to the source.

Referring to FIG. 4, there are two types of ATM OAM flows: (1) F4 flow (at the virtual path indicator level; also referred to as a virtual path), and (2) F5 flow (at the virtual channel indicator level; also referred to as a virtual circuit). In addition, there are end-end F4 and F5 flows as well as segment F4 and F5 flows. An end-end flow is one that is only processed at the endpoints of a connection. A segment flow is one that is processed at connection points (nodes) within a segment, including a segment endpoint. A segment is a sub-path of the overall connection path, and it is usually manually specified. F4 flows are identified by a VPI field and F5 flows are identified by VPI/VCI fields in the header of ATM packets.

To understand the significance of F4 and F5 flow, consider the following example. Suppose that a corporation has two sites that connect to a public ATM network, and that at each site the corporation has a network of ATM switches. A virtual path can be constructed between two sites using only a virtual path field (F4 flow). Thus, the switches in the public network would use the VPI field (indicating the F4 flow) as the only field on which to make forwarding decisions. From the point of view of such switches, this is a virtual circuit network based upon the VPI field. The F5 level is of no interest to these public switches, and they neither use the virtual channel indicator (F5 level) nor remap it. Within the corporate sties, however the full combination of the VPI field and VCI field is used for switching. Any traffic that needs to flow between the two sites is routed to a switch that has a connection to the public network, and its VPI field is mapped onto the appropriate value to get the data to the other site. Thus a virtual path acts like a pipe that contains a bundle of virtual circuits, all of which have the same value in the VPI field. The advantage of this approach is that, although there may be thousands or millions of virtual connections across the public network, the switches in the public network behave as if there is only one connection. This means that there needs to be much less connection-state information stored in the line cards of the switches, avoiding the need for large, expensive table of per-VCI information.

FIG. 5 shows the format of an ATM OAM cell. The ATM OAM cell includes function specific fields 518. An F4 flow pertains to Virtual Path Connections (VPC) and it is detected based on the special Virtual Circuit Identifier (VCI) 206 value of "3" in the ATM cell header for "segment" and "4" for "end-end". A VPC is identified by the Virtual Path Identifier (VPI) 204 value in the ATM cell header. For F4 flows, the VPI value 204 in the OAM cells is the same as that of the VPC to which they belong. F5 flows pertain to Virtual Circuit Connections (VCCs). The VPI 204 and VCI 206 values in an F5 flow are the same as those of the VCC to which they belong. In this latter case, an ATM OAM cell is detected based on the value of 100 or 101, for segment and end-end respectively, in the Payload type identifier (PTI) field 208 contained in the ATM cell header (FIG. 2).

As shown in FIG. 6A, an OAM loopback flow is initiated at a point in the path of the Virtual Connection (VC). The VC can be either a VCC or a VPC. The format of the function specific fields 518 of an OAM loopback cell, as defined in the I.610 specification, are shown in FIG. 7. The function specific fields optionally contain the identifier of the loopback point (FIG. 7; loopback location 706, LLID) and the source identifier (FIG. 7; source ID 708) as well as loopback indication field 702. The special value of all 1's in the LLID field indicates that the loopback point is that of the endpoint of the connection or a segment endpoint. However, an LLID can identify any point in the connection path.

When the OAM loopback cell is initiated, the loopback indication value 702 is set to 1. The OAM cell sent by the source is referred to as the loopback cell in the forward direction (LBF). The loopback point is supposed to detect the OAM cell, set the value in the loopback indication field to 0, and reverse the direction of the cell back to the originator with the correlation ID unchanged. The loopback cell returned from the loopback point is referred to as the loopback cell in the backward direction (LBB). Intermediate points (nodes) between the source and the loopback point in either direction should pass the cell. The source of the OAM cell is supposed to extract the LBB OAM cell and correlate it with one it has sent to determine that the path up to the loopback point is alive. If the source does not receive an OAM loopback cell with the same correlation tag 704 as the one it sent within a configurable period of time, the event is logged. If a configurable number of consecutive OAM loopback cells sent on a connection are not received back at the source, the connection may be declared dead. By systematically varying the loopback point or source along the path of a connection, the point of failure can be detected.

Line cards 902 that perform ATM switching functions have the architecture shown in FIG. 3. There is a data block 302 that lies in the data path. Data block 302 performs all switching and traffic management functions. Further, there is a control block 304 that performs control functions, such as programming the circuit states in the data path block, processing connection setup, or performing maintenance functions. Many systems perform the loopback processing at a loopback point in control block 304 outside of the data path. While functional, such loopback processing techniques are less than desirable because they rely on control block 304 processing resources that should be reserved for implementing control functions. Moreover, because it is the case that the data block 302 and control block 304 are separated as illustrated in FIG. 3, it is possible for data block 302 to remain fully functional even in the case where control block 304 is no longer functioning. If a control block 304 of a line card 902 is dead, data can still flow through the data block 302 of the line card 902. Thus, loss of control block 304 should not result in the interpretation that the line card 902 is not passing data. As such, another drawback with conventional loopback processing techniques is that they do not provide a true source of data liveliness. Such conventional techniques may indicate a node is no longer alive when the control block 304 of a line card 902 in the node is not responsive but data is still flowing through the data block 302 of the line card 902.

Accordingly, there is a need in the art for a loopback implementation that performs functions fully in the data block 302. Furthermore, there is a need in the art for loopback implementations that can test an ATM network with line card resolution. In other words, there exists a need in the art for ATM loopback implementations that can test the integrity of a specific line card of a specific node in the network

SUMMARY OF INVENTION

The present invention addresses the shortcomings found in the prior art. The present invention provides a mechanism that enables loopback OAM cells to traverse the data path of the connection being tested using only data blocks in line cards in the data path. Thus, the present invention does not rely on line card control blocks of line cards of intermediate nodes (switches) in the OAM loopback path. Furthermore, in the present invention, specific line cards can be targeted for testing. In some embodiments of the present invention, such novel loopback processing is facilitated by assigning a different network unique logical identifier to each line card in the ATM network. Further, in some embodiments, such novel loopback processing is facilitated by the use of specialized fields in an internal header that is wrapped around OAM cells by a line card before the OAM cells are sent to a corresponding switch fabric for routing. Still further, in some embodiments, such novel loopback processing is facilitated by augmented circuit state information maintained at each line card in the network for each of the connections within the network. In preferred and typical embodiments, all three techniques (i) network unique line card identifiers, (ii) specialized fields in the internal header that is wrapped around OAM cells by the line card before switch fabric processing, and (iii) augmented circuit state information, are used to enable OAM loopback that does not use or require the control block circuitry of line cards in the OAM loopback path.

One embodiment of the present invention provides a communication system comprising (i) a plurality of sources, (ii) a plurality of destinations, and (iii) a plurality of switches forming an asynchronous transfer mode (ATM) network connecting the sources to the destinations. Each switch in the plurality of switches includes a plurality of line cards. Further, each switch in the plurality of switches includes (i) a forward path for receiving ATM cells in a forward direction toward a destination through the network and (ii) a return path for returning ATM cells in a reverse direction through the network toward a source.

The ATM network comprises a plurality of connections where, for each respective connection, one of the plurality of sources is linked to one of the plurality of destinations through the network by linking forward paths from one or more switches in the plurality of switches that is associated with the respective connection. Further, one of the plurality of destinations is linked to one of the plurality of sources through the network by linking return paths from the one or more switches that is associated with the respective connection.

The ATM network further comprises operation administration and maintenance (OAM) cell processing means (e.g., circuitry) for detecting a failure in a connection in the plurality of connections arising out of a failure of a line card in a switch (node) in the one or more switches associated with the connection. The OAM cell processing means detects the failure of the line card without use of a line card control block.

In some embodiments, the connection tested by the OAM cell is a virtual channel connection or a virtual path connection. In some embodiments, the OAM cell processing means comprises an assignment of a unique logical identifier to each respective line card in the plurality of line cards in each switch in the plurality of switches in the ATM network.

In some embodiments, each respective line card in the plurality of line cards in each switch in the plurality of switches in the ATM network includes a data block. Further, the logical identifier associated with each such line card is addressable by the data block of the line card. In some embodiments, the logical identifier for a line card has the format node_ID.slot_ID where,
node_ID is an identity of the switch (node) in which the line card corresponding to the respective logical identifier resides; and
slot_ID is an identity of the line card corresponding to the respective logical identifier.

In some embodiments, the OAM cell processing means comprises augmented circuit state information at each respective line card in the network. This augmented circuit state information includes an indication of whether the respective line card is a local endpoint for an OAM loopback. In some embodiments, the augmented circuit information includes an indication of whether an ATM cell has reached a local endpoint for an OAM loopback. In some embodiments, the ATM cell is an end-end loopback cell. In some embodiments, the ATM cell is part of an end-end F4 flow, an end-end F5 flow, a segment F4 flow, or a segment F5 flow.

In some embodiments, the OAM cell processing means further comprises wrapping a header around an ATM cell when the ATM cell is in a line card in the plurality of line cards associated with the switch. This header includes a type field that indicates how to deal with an OAM cell. The header further includes an egress slot identifier that identifies the egress line card to which the ATM cell should be routed.

Another embodiment of the present invention provides apparatus and methods for identifying a failure in a communication system at a predetermined line card. An organization and maintenance (OAM) cell is received at a first line card in a switch in the communication system. A determination is made as to whether the OAM cell is designated for loopback at the first line card in the switch or a remote line card in the switch. When the OAM cell is designated for loopback at the first line card in the switch, an internal header wrapped around the OAM cell indicates the slot id of the first line card. When the OAM cell is designated for loopback at a second line card in the switch an internal header wrapped around the OAM cell indicates that the OAM cell is a remote loopback OAM cell.

BRIEF DESCRIPTION OF THE FIGURES

FIG. 5 illustrates an OAM ATM cell in accordance with the prior art.

FIG. 7 illustrates function specific header of an OAM ATM cell in accordance with the prior art.

FIG. 11 shows an augmented circuit state for an ATM connection in accordance with an embodiment of the present invention.

Like reference numerals refer to corresponding parts throughout the several views of the drawings.

DETAILED DESCRIPTION OF THE INVENTION

Figure 8:
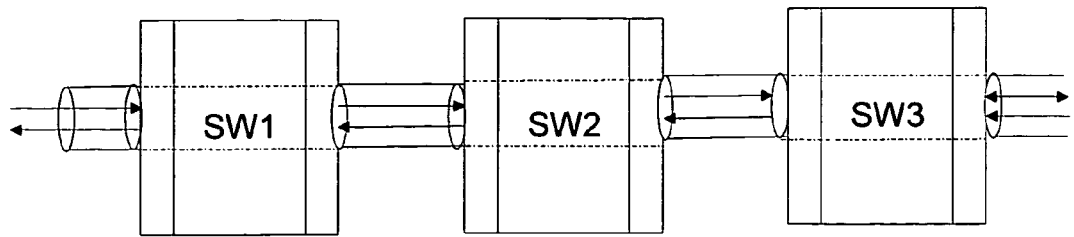
FIG. 8 illustrates a bi-directional circuit traversing multiple network elements in accordance with the prior art.
Figure 9:
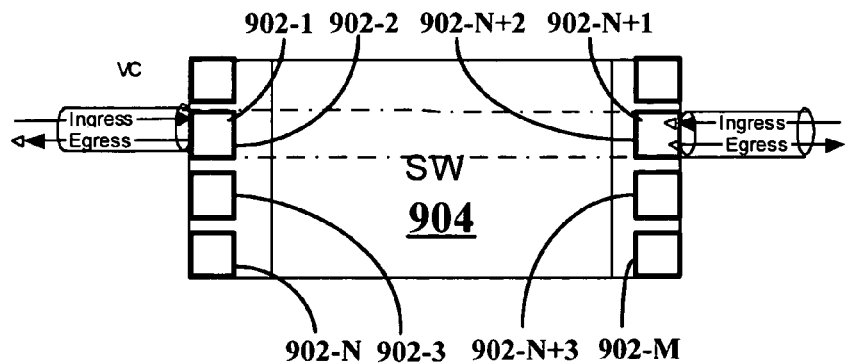
FIG. 9 illustrates the ingress and egress line cards in a connection relative to the data flow direction in an ATM switch in accordance with the prior art.

An ATM connection is usually a bi-directional connection that traverses one or more network elements in an ATM network as illustrated in FIG. 8. At every node, there is an ingress line card and an egress line card for a direction of the ATM connection as illustrated in FIG. 9. Line cards contain physical interfaces that connect a node to a network via links. An ingress line card in the direction of data flow is defined to be the card that receives ATM cells from the network. An egress line card in the direction of data flow is the line card that receives cells from another line card in the same node through the node data-backplane (switch fabric) 904 and possibly forwards cells into the network. Ingress and egress line cards are defined relative to data flow of a connection.

Figure 1:
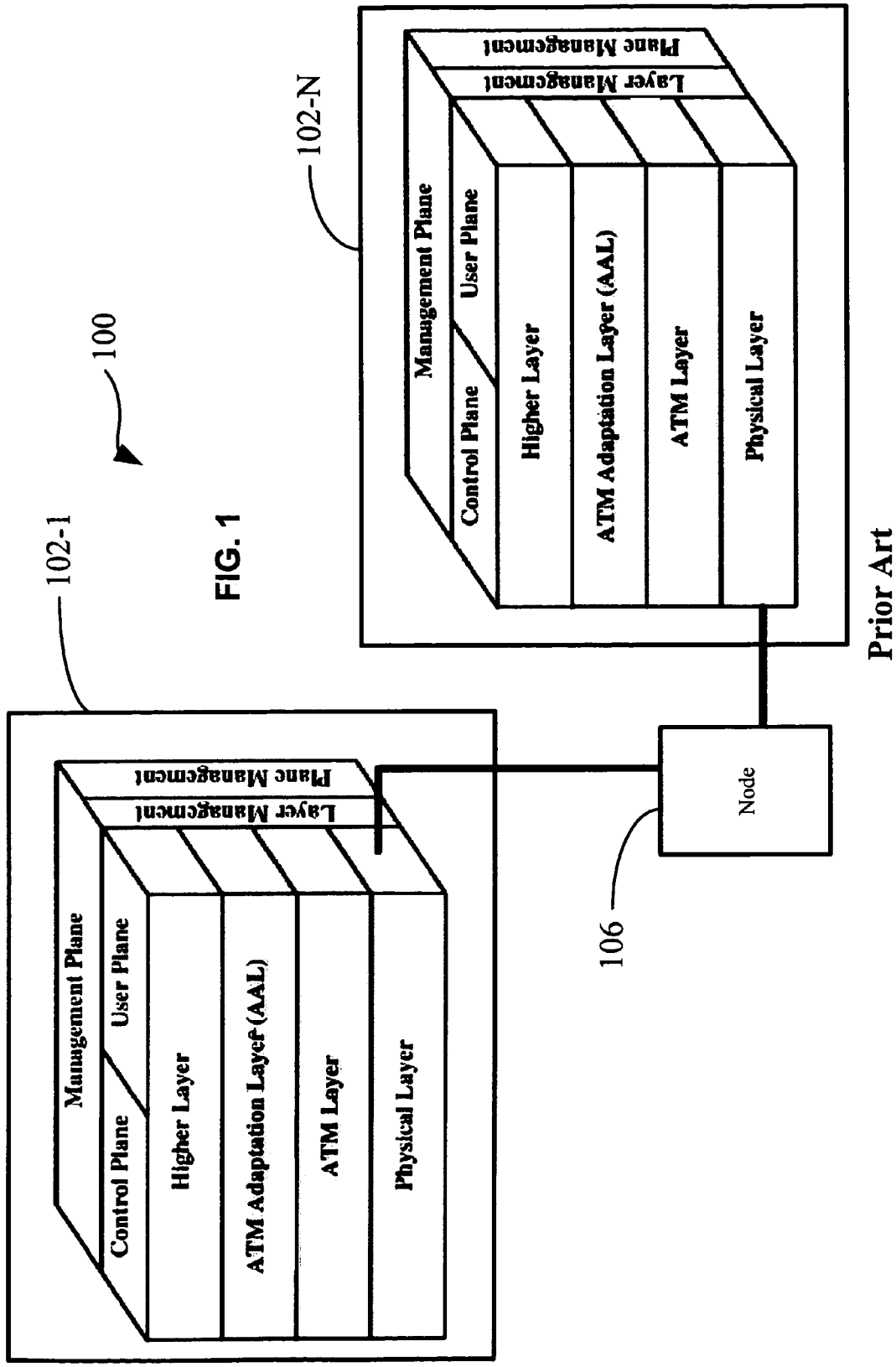
FIG. 1 illustrates an ATM switch between a start point and an end point in accordance with the prior art.
Figure 2:
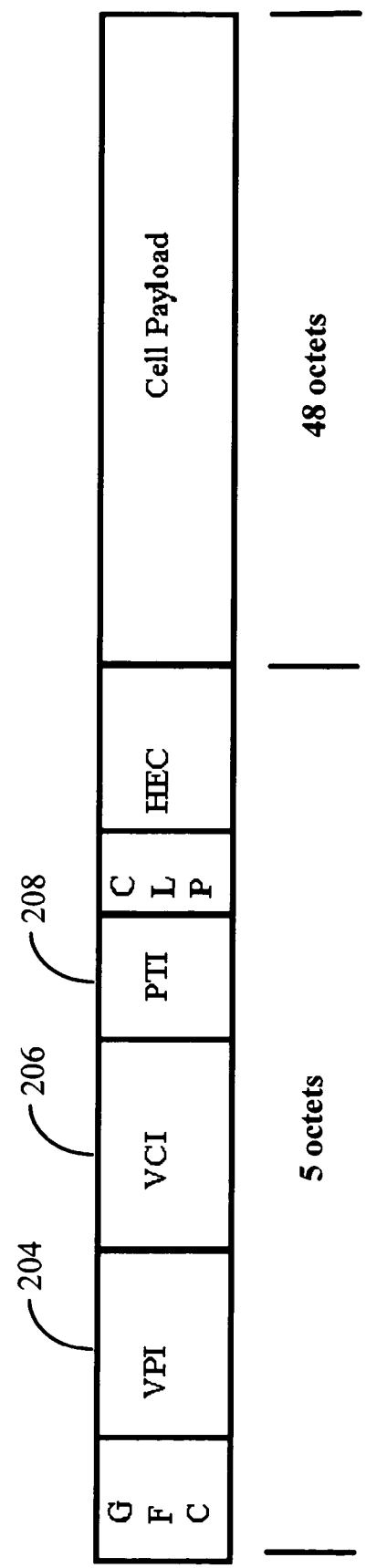
FIG. 2 illustrates an ATM cell including a 5 octet header and a 48 octet payload in accordance with the prior art.

During normal network operation, an ATM cell having the data structure described in FIG. 2 will arrive at an ingress line card. The VPI/VCI field 204/206 and the port on which the cell arrives (a port is the logical channel on which the cell arrives and connects the node to the rest of the network) are used to uniquely identify a predetermined connection state within the ATM network to which the ATM cell belongs. This predetermined connection state is found in a lookup table in a memory that is addressable by the ingress line card. Typically, the connection state will be for either a virtual channel connection (VCC) or a virtual path connection (VPC). The connection state contains enough information to further process the cell. For instance, such information indicates the QoS service class of the connection, whether the connection is a VPC or VCC, whether the cell should be locally terminated or switched, and the egress card to which the cell should be sent to forward it further onto the network. A typical ingress state of a connection is shown in Table 1.

TABLE 1

Typical ingress state of a connection 4-bit ciruit-type (same meaning in every circuit):
    0 for ATM
    1 for Frame Relay
    2 for Multiple Protocol Label Switched
8-bit flag bit
    0 valid/invalid flag
1-bit set for frame count and unset for cell count
1-bit police/no police flag
1-bit ALL5
1-bit terminate on egress card
    0 no
    1 yes
1-bit cell-switched-bit
    0 for locally terminated,

TABLE 1-continued

Typical ingress state of a connection 1 for cell switched
1-bit VPC/VCC
    0, VPC
    1, VCC
4-bit QOS_identifier
4-bit circuit-action
16-bit out_slot-id
1-bit First cell
1-bit EPD_Enabled
1-bit PPD_Enabled
1-bit EPD
1-bit PPD
1-bit multicast-bnit
    0 unicast
    1 multicast
18-bit egress CID (eCID on remote card)

In one aspect of the present invention, the connection state of one or more connections in the ATM is augmented by information that is sufficient to enable OAM loopback cell processing without the use of control blocks 304 of line cards 902 in the loopback path. FIG. 11 illustrates the augmented connection state information that is used to support control block 304 independent OAM loopback cell processing in accordance with one embodiment of the present invention. The information in FIG. 11 is collectively referred to herein as a loopback instruction.

Figure 10:
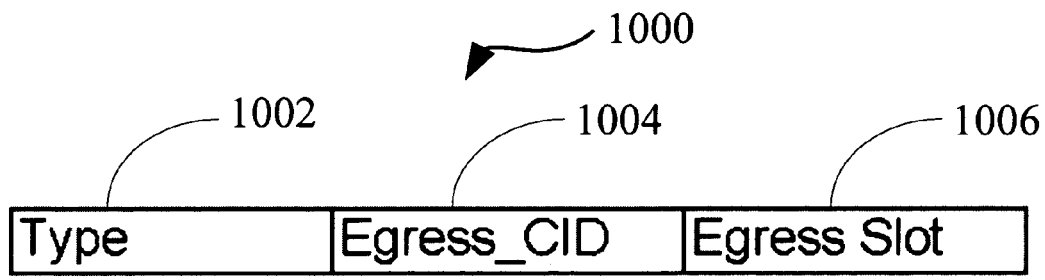
FIG. 10 shows an internal header that is wrapped around an ATM cell in a line card before the line card routes the ATM cell to the switch fabric in accordance with the present invention.

A cell within a switch is wrapped with a header by a line card 902 and then sent to the switch backplane (switch fabric 904). The switch backplane uses this extra header to route the ATM cell to the correct line card 904 within the switch. In some embodiments of the present invention, this header is populated with specialized fields that are designed to facilitate control block 304 independent OAM loopback cell processing. Referring to FIG. 10, in one example, the cell header 1000 that is wrapped around the cell contains the egress slot 1006 to which the cell is directed and the egress circuit identifier 1004 on that slot as shown in FIG. 10. Additionally, a "type" field 1002 is carried in header 1000. The header of the present invention is advantageous because it provides an indication of which direction in an OAM loopback a given OAM cell is traveling (e.g., towards the loopback point or back to the origin of the test).

In another aspect of the invention, a logical identifier is stored on each line card 902 in an ATM network. The purpose of these logical identifiers is to uniquely identify these line cards to the network. This logical identifier can be stored at a place that is co-located with the cell-processing engine in the data path. The line card logical identifier can be written in the LLID 706 or source ID 708 fields of an OAM cell as described in more detail below. In one embodiment, each such logical identifier has the format:

Logical Identifier=Node_ID.Slot_ID

That is, the 16-byte logical identifier is defined by a node identifier part (Node_ID) followed by a slot identifier (Slot_ID) part. An ATM network implementation is free to define how many bytes are allocated for the node identifier and how many bytes are allocated for slot identifier. In preferred embodiments, the node administrator has the flexibility to configure the Node_ID/Slot_ID byte allocation provided that the configuration has node-scope (each line card is assigned an identifier that is network unique) and that it is consistent across the network. The division of the logical identifier between Node_ID and Slot_ID allows for the masking off of the Slot_ID to obtain the Node_ID or the masking off of the Node_ID to obtain the Slot_ID. Thus, in a preferred embodiment, along with the logical identifier, every line card 902 has a Node_ID mask defined by:

Node_ID_Mask=1 ... 10 ... 0

The Node_ID mask has as many 1's as the number of bits corresponding to the Node_ID and as many 0's as the number of bits corresponding to the Slot_ID. If embodiments where the Node_ID/Slot_ID byte allocation is configurable, this mask is configurable as well.

A slot holds a line card. Thus, line cards in the same node share the same Node_ID part but they differ in the Slot_ID part. It should be noted that it is important for a logical identifier to be network-wide unique although different switches/routers in the network can have a different scheme for assigning logical identifiers than the one stated here. The only requirement is that the bits or bytes assigned to a Node_ID based on this scheme be also network-wide unique. The uniqueness of the logical identifier and the Node_ID parts allow the cell to be processed at the right node. How that node interprets the logical identifier is specific to the node that owns it. Thus, networks with nodes that use the I.610 compliant scheme described in the examples herein and those that implement a different scheme, subject to aforementioned requirement, should interoperate as long as such other schemes also conform to the I.610 specification.

FIG. 12 depicts the processing of end-end loopback cells in accordance with some embodiments of the present invention. In step 1202, an ATM cell arrives at an ingress line card 902 where the ATM cell header is checked. If there is header error, the cell is dropped. Otherwise, the port, VPI 204 and VCI 206 are looked up in a database of existing connections. Typically, this lookup returns a pointer to the connection state. In some instances, this lookup returns the connection state itself. If the lookup does not result in a successful hit, the arriving VPI/VCI is considered not valid and the cell is thrown away. Otherwise, processing of the cell proceeds in accordance with Case 1 (FIG. 12) when the connection is a VCC and Case 2 (not illustrated) when the connection is VPC.

Case 1: Connection is VCC.

Referring to FIG. 12, in step 1204, if the cell is not dropped as a result of ATM policing (see, for example, the policing techniques in The ATM Forum Technical Committee, Traffic Management Specification, Version 4.1, March 1999), OAM processing is enabled. If the circuit state indicates that the connection is a VCC, PTI field 208 (FIG. 2) of the cell is analyzed. If field 208 stores the value 100 or 101, the cell is an F5 OAM cell. Next, CRC-10 522 (FIG. 5) is checked. If the CRC-10 check fails, the cell is dropped. Otherwise, OAM cell processing proceeds. The focus here is on the detection and processing of OAM cells. If OAM type 514 and function type 516 in the OAM cell payload are 0001 (fault management type) and 1000 (OAM Loopback), respectively, the OAM cell is a loopback cell. There are several situations to consider.

If end-end Loopback (PTI 208=100) (1206-Yes) and the Loopback Indication field 702 (1208-Yes) in the arriving cell is set to 1, this is an LBF cell. LLID 706 is extracted from the cell (step 1210). Next, a determination is made as to whether the cell should be looped back (i) at the ingress line card or (ii) a remote card. As described below, this determination is made using (i) augmented connection state information that is tracked in accordance with the present invention, (ii) the assignment of unique identifiers to lines cards in the ATM network, and (iii) the use of a specialized internal header that is wrapped around ATM cells by line cards prior to sending the ATM cells to switch fabrics.

1.a. Processing an LBF Cell at the Ingress Card in End-end Loopback

If the LLID is all 1's: (FIG. 12A; 1212-Yes) and the Local_Endpoint_Indication 1102 (FIG. 11) is set to 1 (FIG. 12A; 1214-Yes), the cell should be looped back at the ingress card on which the cell arrives. The cell is to be sent back towards the other end-point of the connection in the opposite direction (1216). The details of 1216 processing is shown in FIG. 12B.

Figure 12A:
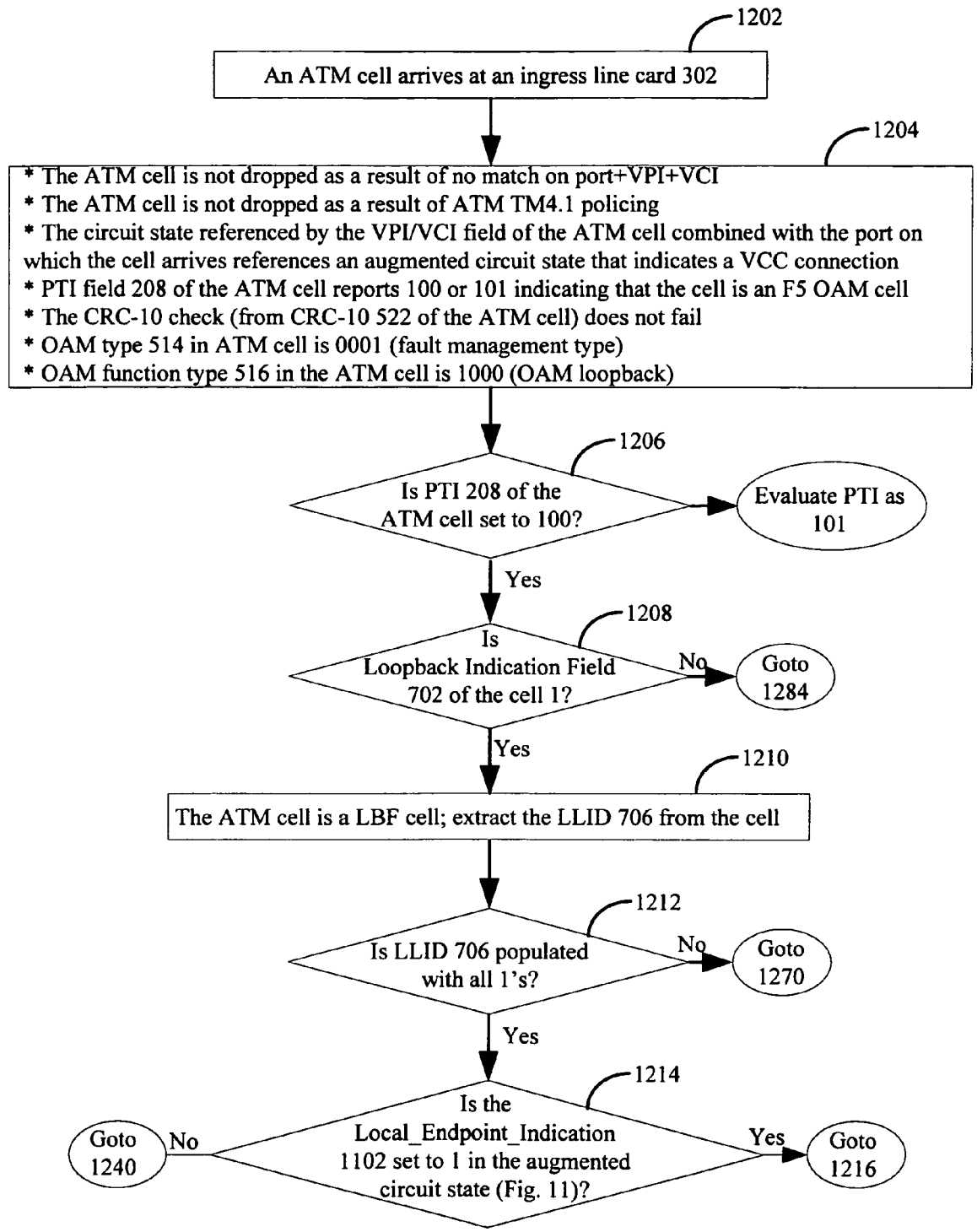
FIGS. 12A-12F illustrate a method of processing an ATM loopback cell within a VCC connection using only the data elements in the data path in accordance with an embodiment of the present invention.
Figure 12B:
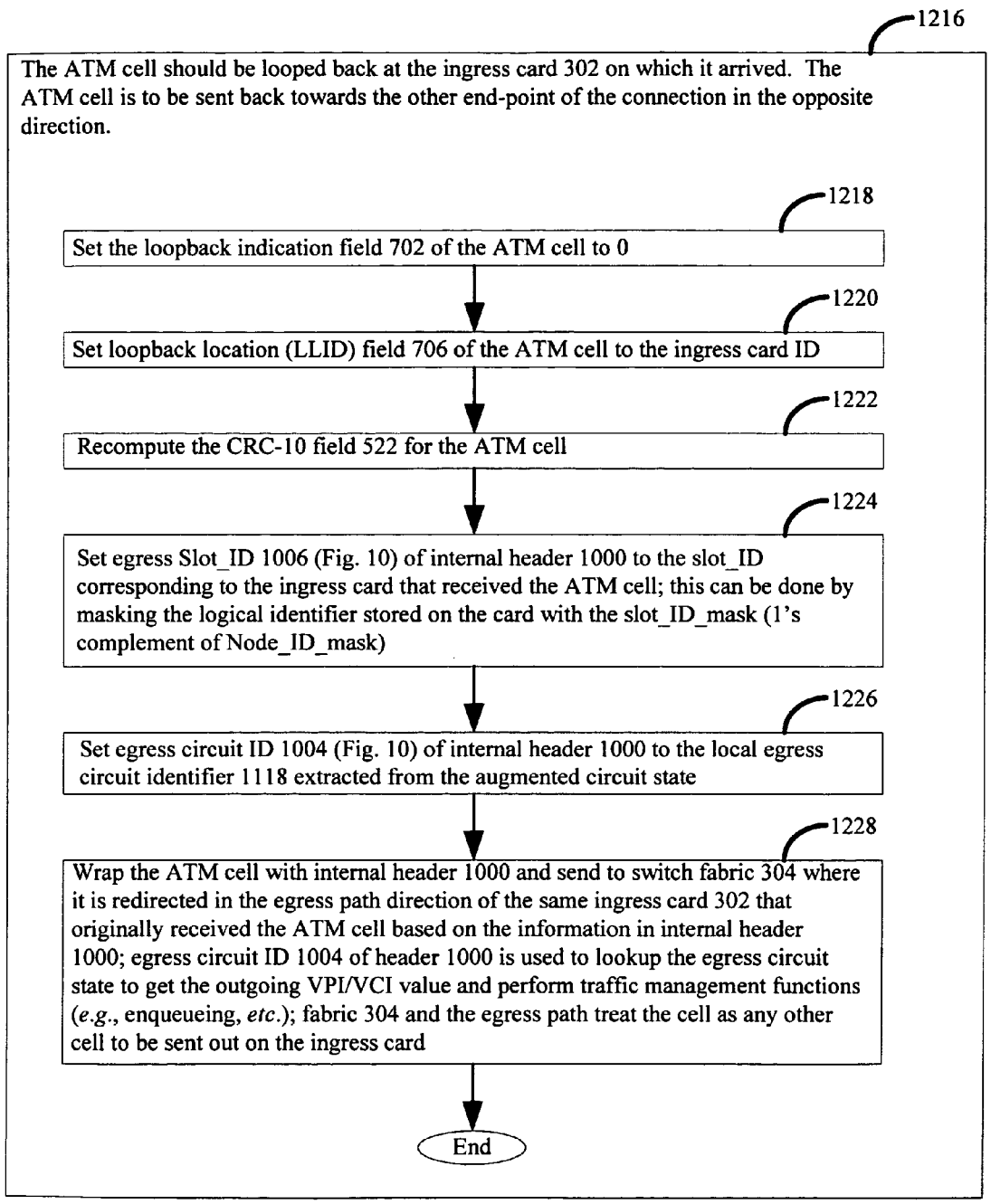
Figure 12C:
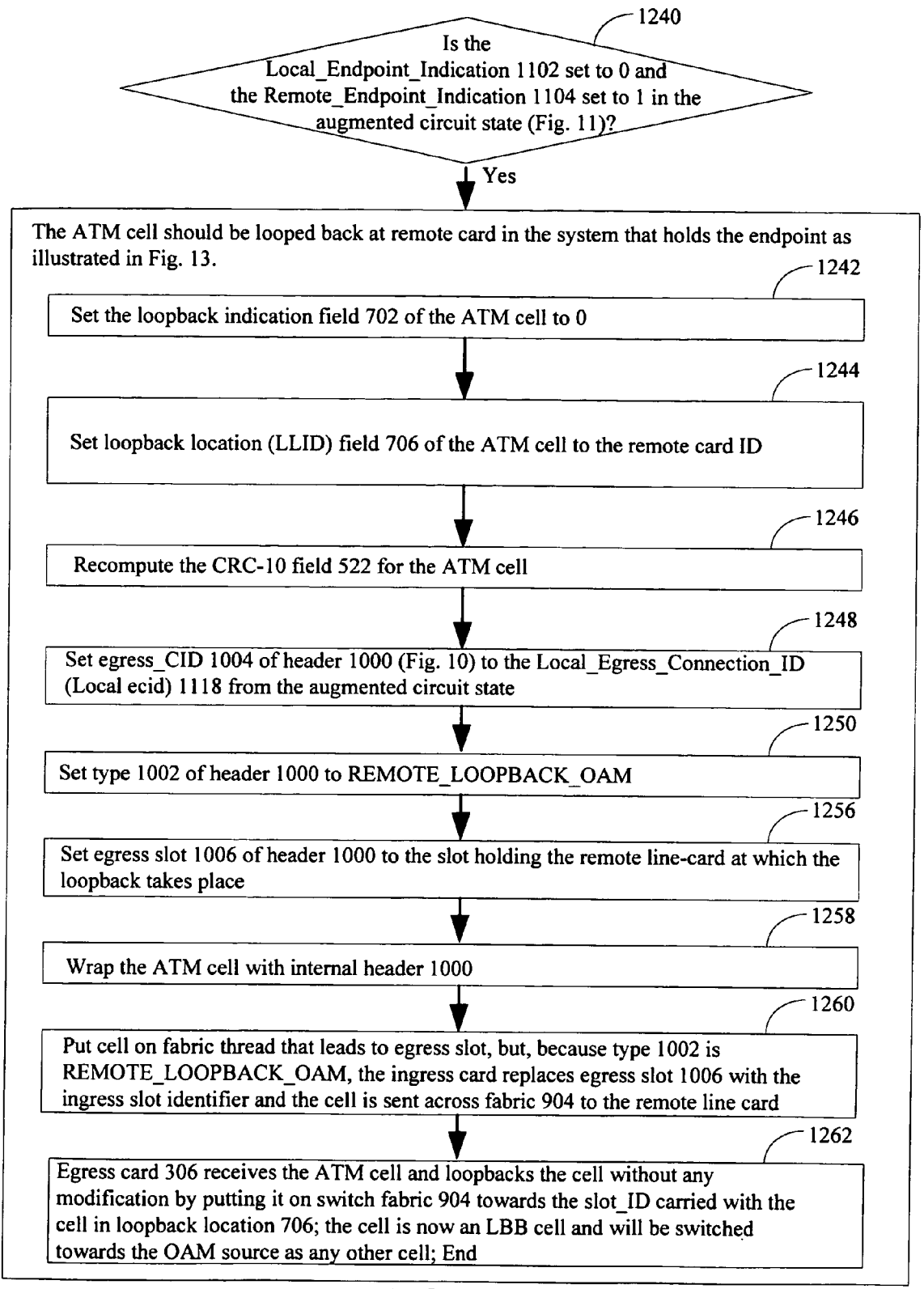
Figure 12D:
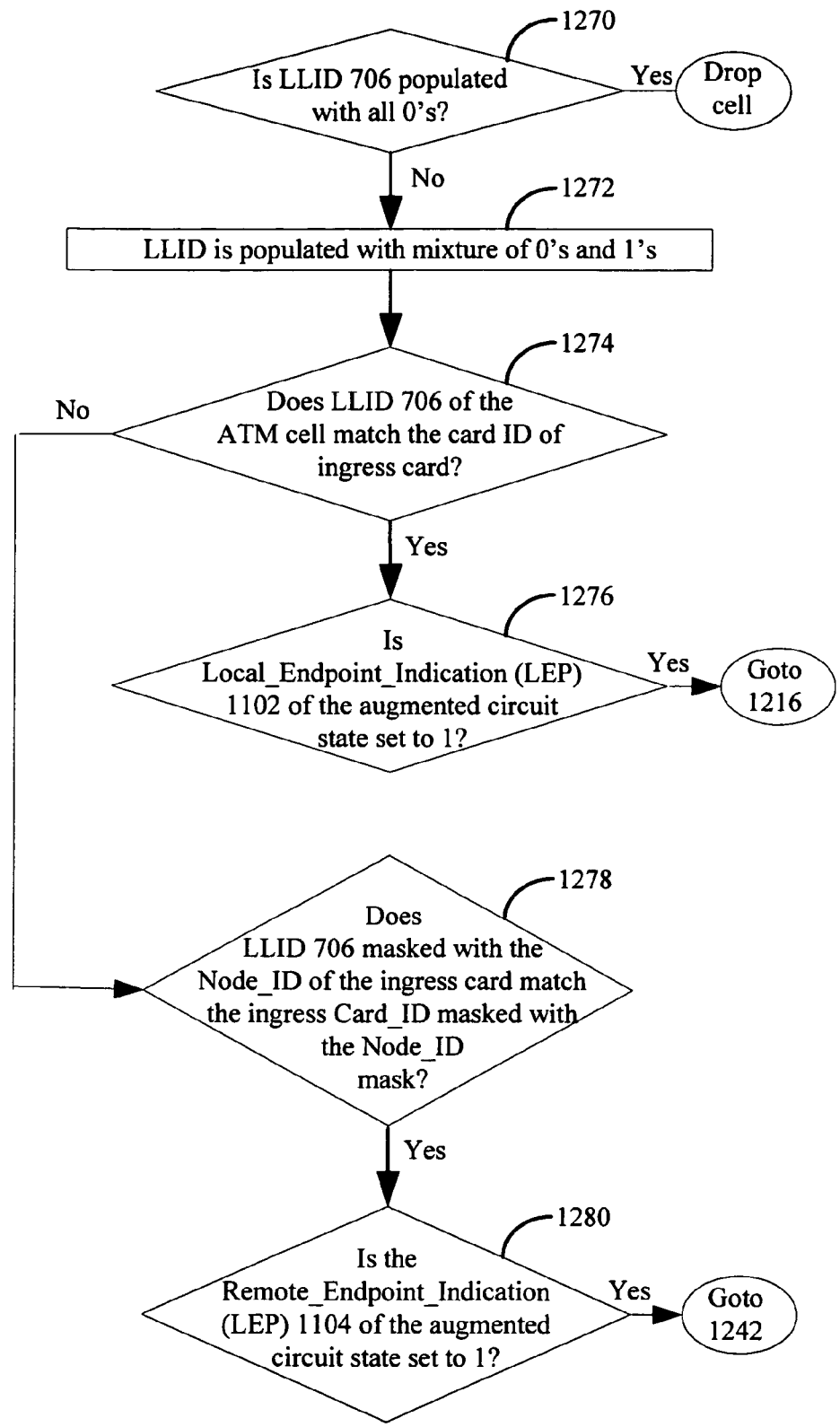

The loopback indication field 702 in the ATM cell is set to 0 (FIG. 12B 1218). Further, the LLID field 706 in the ATM cell is set to the card ID of the ingress card (FIG. 12B 1220). The CRC-10 field 522 of the ATM cell is recomputed (FIG. 12B 1222). In step 1224, the egress Slot_ID 1006 in the internal control header 1000 that will be wrapped around the ATM cell by the ingress card is set to the Slot_ID corresponding to the ingress card. The Slot_ID can be obtained by masking the logical identifier stored on the card with the Slot_ID_Mask (1's complement of Node_ID_Mask).

In step 1226, the egress circuit ID in the system-internal control header 1000 is set to the local egress circuit identifier 1118 extracted from the circuit state for the connection referenced by the ATM cell.

In step 1228, the cell is wrapped around with the internal header 1000 and sent to the switch backplane 904. The switch backplane 904 redirects the cell to the egress path direction of the same card based on the information in the system-internal control header 1000 associated with the cell. The egress circuit identifier 1004 is used to lookup the egress circuit state on the egress card to get the outgoing VPI/VCI value and perform appropriate traffic management function (e.g., enqueuing, etc.). It should be noted that, in this case, the backplane and the egress path treat the cell as any other cell to be sent out of this egress line card.

1.b. Processing an LBF Cell at a Remote Card in End-End Loopback

Figure 6A:
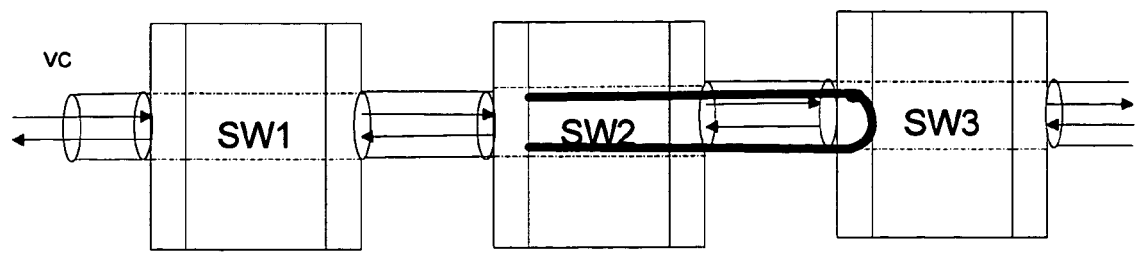
FIG. 6A illustrates the path of an OAM loopback mechanism looped back at an ingress line card.
Figure 6B:
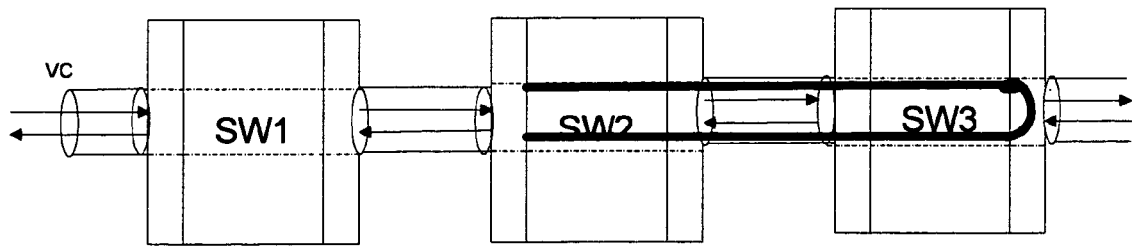
FIG. 6B illustrates the path of an OAM loopback mechanism looped back at an egress line card.

Returning to decision block 1214 in FIG. 12A, if Local_Endpoint_Indication 1102 is set to 0 (1240-No) and Remote_Endpoint_Indication 1104 is set to 1 (1240-Yes), the cell must be looped at another card in the system that holds the endpoint, as shown in FIG. 6B. Processing proceeds in FIG. 12C. In step 1242, the ingress card resets the loopback indication field 702 of the ATM cell to 0. In step 1244, the LLID field 706 of the ATM cell is set to the remote card ID (the endpoint). In step 1246, the CRC-10 field 522 of the OAM cell is recomputed. Alternatively, the remote card can do the OAM cell modification.

In step 1248, the egress connection identifier 1004 of a header to be wrapped around the ATM cell by the ingress line card is set to the value of the Local_Egress_Connection_ID (local ecid) 1118 from the augmented circuit state of the connection. In step 1250, the type 1002 of the header 1000 is set to REMOTE_LOOPBACK_OAM. In step 1256, the egress slot 1006 of header 1000 is set to the slot holding the remote line-card at which the loopback takes place. In step 1258, the ATM cell is wrapped with the internal header 1000 that was defined in steps 1248-1256.

In step 1260, the ATM cell is put on a fabric thread that leads to the egress slot. However, before the cell is sent, the cell type is examined. Since the type field 1002 of the header 1000 wrapped around the ATM cell is set to REMOTE_LOOPBACK_OAM, the ingress line card replaces the value in the egress slot field 1006 in the header 1000 with the ingress slot identifier and the cell is sent across the fabric to the remote egress card.

Referring to step 1262, the remote egress card (FIG. 6B), when it receives the cell, loopbacks the cell without any modification by putting it on the fabric towards the Slot_ID carried with the cell in the system-internal header. Now, the cell is an LBB cell and the cell will be switched towards the OAM source (loopback source) as any other cell.

1.c. Processing an LBF Cell in Which the LLID Field of the Cell References the Loopback Location in End-end Loopback Referring back to step 1212 of FIG. 12A, if the loopback location field 706 in the ATM cell is not populated by all 1's (1212-No), process control passes to step 1270 where a determination is made as to whether field 706 is populated with all 0's. If so (1270-Yes), the cell is dropped. If not (1270-No), field 706 stores a mixture of 0's and 1's that define the address of the loopback location (1272). As such, subsequent steps are designed to extract the loopback location from the loopback location field 706 in the ATM cell.

As a first step in determining the loopback location, a determination is made as to whether field 706 of the ATM cell matches the card_ID of ingress card 302. If so (1274-Yes), a determination is made as to whether the Local_Endpoint_Indication (LEP) 1102 in the augmented control state information for the connection that the ATM cell is in is set to 1. If so (1276-Yes), the ingress line card is the loopback location. Therefore, the cell is looped back at the ingress line card using the procedure described in 1.a., above and the corresponding processing steps 1218-1228 of FIG. 12. Otherwise, the cell is dropped.

If the card_ID of the ingress line card does not match LLID 706 of the ATM cell (1274-No), the LLID is masked with the Node_ID of the line card and it is compared to the card_ID of the line card masked with this Node_ID mask. If the two masked fields match (1278-Yes), and Remote_Endpoint_Indication 1104 of the augmented circuit state of the connection that the ATM cell is in is set (1280-Yes), the cell must be looped back at the node at a remote card. Accordingly, the procedure is the same as that described in 1.b., above and steps 1242-1262 of FIG. 12. In this latter case, the remote Slot_ID is obtained by masking the LLID with the 1's complement of the Node_ID_Mask. Alternatively, a Slot_ID mask could be stored as well and used to mask the LLID. The Slot_ID extracted from the cell must match the egress Slot_ID in the circuit state. If there is no match and the Local_Endpoint_Indication 1102 or the Remote_Endpoint_Indication 1104 is set, the cell is dropped. If there is a match, but both the Local_Endpoint_Indication 1102 and Remote_Endpoint_Indication 1104 bits are set to 0, the OAM cell is dropped and no LBB is returned as the OAM cell is terminated at an intermediate point in the connection. Otherwise, the cell is forwarded as any other cell in accordance with 1.b.

1.d. Processing an LBB Cell in End-end Loopback

Figure 12E:
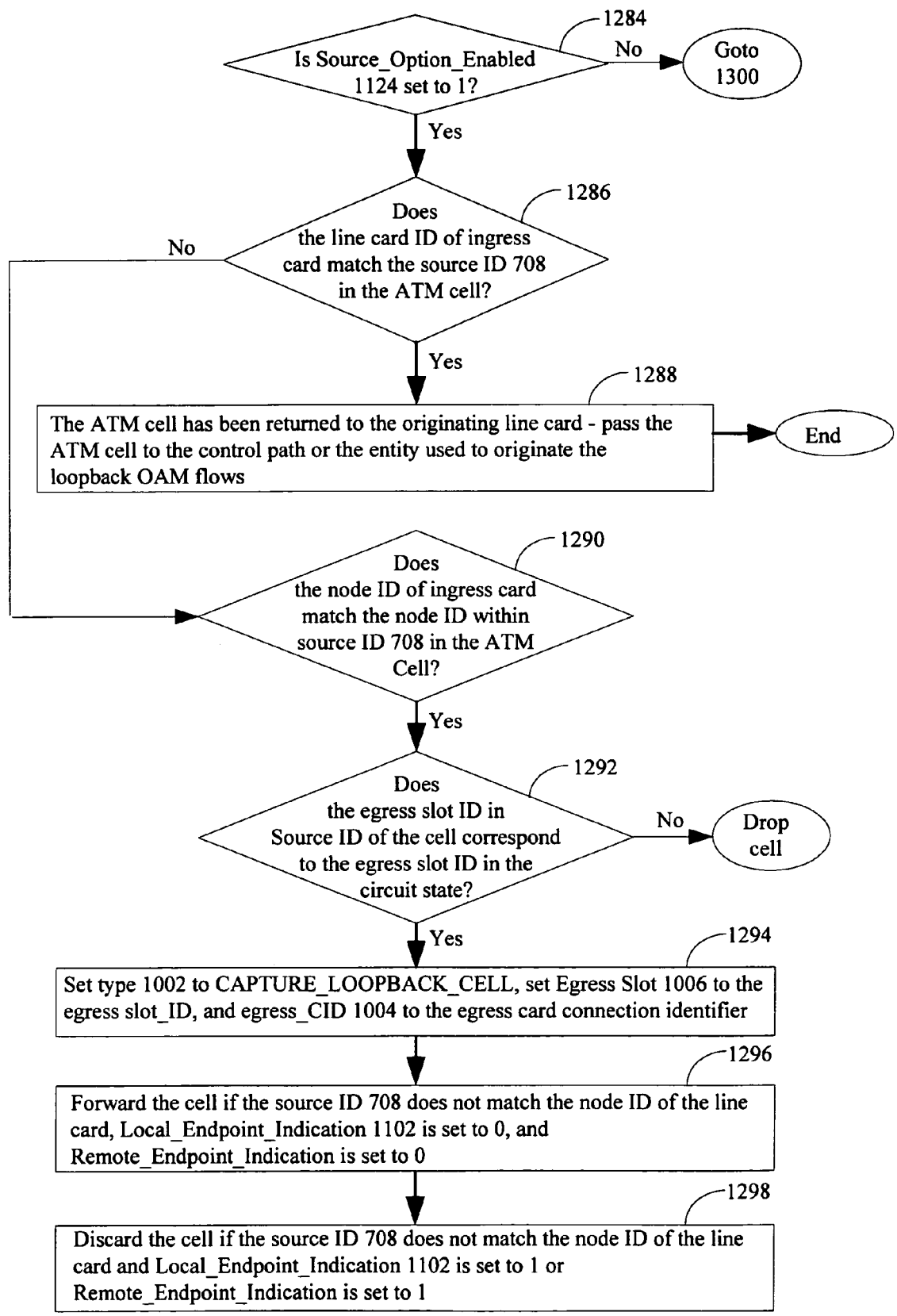
Figure 12F:
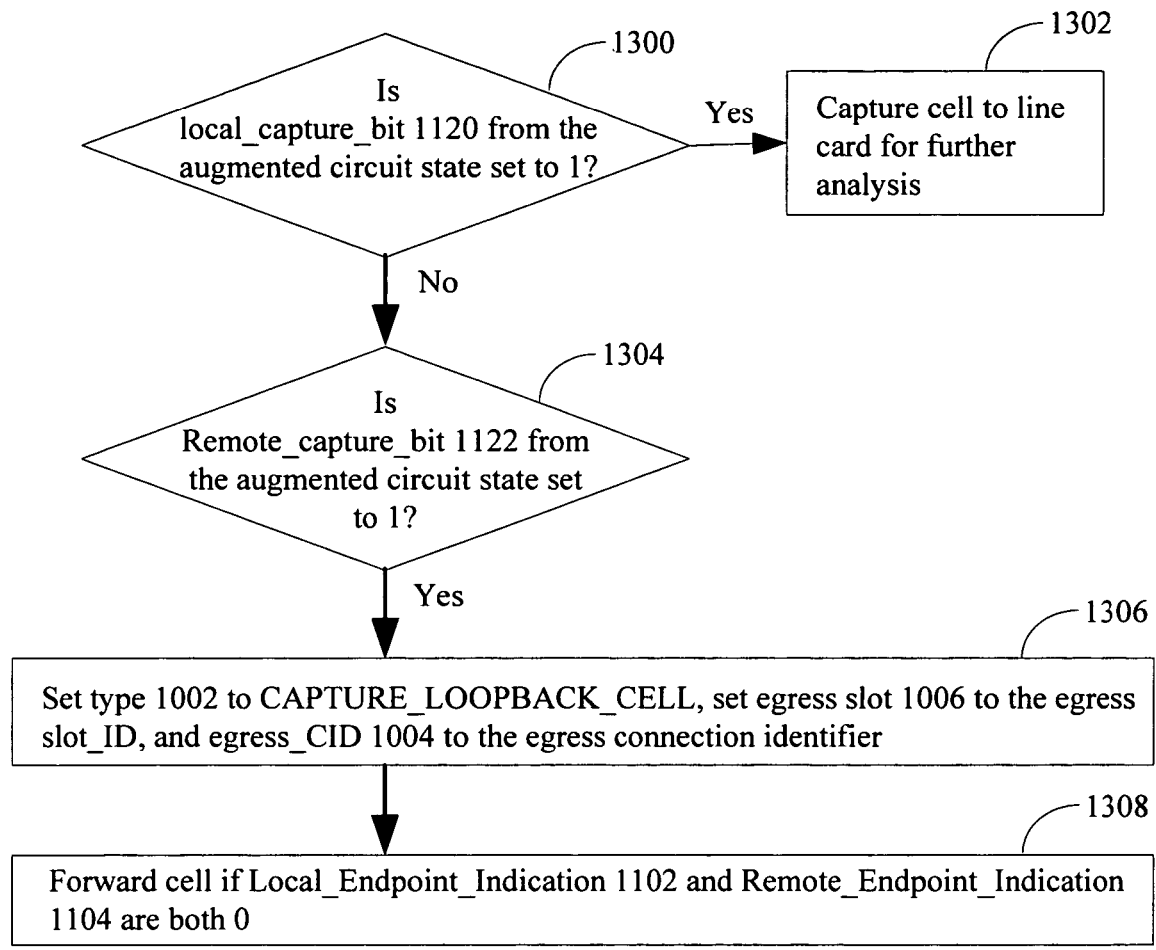

Referring back to step 1208, if the loopback indication field 702 of the ATM cell is not set to 1 (1208-No), the subject ATM cell is a loopback cell in the backward direction (LBB cell). If Source_Option_Enabled 1124 in the augmented circuit state is set to 1 (1284-Yes), a determination as to whether the line card_ID of the ingress card matches the source ID 708 of the ATM cell. If so, (1286-Yes), the cell is captured to the control path or to the entity used to originate loopback OAM flows (1288; FIG. 12E).

Alternatively (1286-No), if only the node ID of the ingress card matches the node ID within source ID 708 of the ATM cell (1290-Yes), the OAM loopback cell must be captured at the remote slot in the connection path. A check is made to determine whether the egress Slot_ID in the source ID 708 corresponds to the egress Slot_ID in the circuit state. If they do not match (1292-No), the cell is dropped. If they do (1292-Yes) a series of steps are performed. In step 1294, the type 1002 of the header 1000 is set to CAPTURE_LOOPBACK_CELL, the egress Slot_ID 1006 of the header 1000 is set to egress card Slot_ID, and the egress connection_identifier 1004 of the header 1000 is set to the egress card connection identifier. The cell is captured to the entity in the system that originates loopback OAM flows for further processing (e.g., matching correlation ID). If the source ID 708 in the OAM cell does not match the Node_ID of the line card, and this is not the endpoint (e.g., Local_Endpoint_Indication 1102 and Remote_Endpoint_Indication 1104 are set to 0), the cell is forwarded as any other cell (step 1296). If the source ID 708 in the OAM cell does not match the Node_ID of the line card and this is the endpoint (e.g., Local_Endpoint_Indication 1102 or Remote_Endpoint_Indication 1104 set to 1) the cell is dropped (1298).

Referring back to step 1284, if Source_Option_Enabled 1124 in the augmented circuit state is not set to 1 (1284-No), a determination is made as to whether the local_capture_bit from the augmented circuit state is set to 1. If so (FIG. 12F 1300-Yes), the OAM cell is captured on the line card for further analysis (1302). Otherwise (FIG. 12F 1300-No), if Remote_Capture_Bit 1122 from the augmented circuit state is set (1304-Yes), the connection_identifier 1002 of the header 1000 wrapped around the cell is set to CAPTURE_LOOPBACK_CELL, the egress Slot_ID 1006 of header 1000 is set to the egress Slot_ID, and the egress_CID 1004 is set to the egress connection identifier (step 1306). In step 1308, the cell is captured to the entity in the system that originates loopback OAM flows for further processing (e.g., matching correlation ID). If the cell is not to be captured at this node and this node does not contain the endpoint (e.g., local endpoint_indication 1102 and remote endpoint_indication 1104 are both 0) the cell is forwarded as any other cell (step 1308). If the node contains the endpoint but the cell is not captured, the cell is dropped.

2.a. Processing an LBF Cell at the Ingress Card in Segment Loopback Where LLID is All 1's Referring back to step 1206, if PTI field 208 reports a 101 and the loopback indication field 702 in the arriving cell is set to 1, the ATM cell is an LBF cell. If the LLID is all 1's and the Local_Segment_Sink_Indication bit 1106 of the circuit state of the connection that the ATM cell is in is set to 1, the cell should be looped back at the ingress card on which the cell arrives. The cell must be sent back towards the other end point of the connection in the opposite direction.

The loopback indication field 702 in the cell is set to 0. The LLID field 706 is set to the receiving line card ID, and the CRC-10 522 is recomputed for the cell. The egress Slot_ID 1006 in the system-internal control header 1000 is set to the Slot_ID corresponding to this ingress card. The Slot_ID can be obtained by masking the logical identifier stored on the card with the Slot_ID_Mask (1's complement of Node_ID_Mask). The egress circuit ID 1004 in the system-internal control header 1000 is set to the local egress circuit identifier extracted from the circuit state. The cell is wrapped with the system-internal header 1000 and sent towards the switch backplane 904. The switch backplane 904 redirects the cell to the egress path direction of the same card based on the information in the system-internal control header 1000 associated with the cell. The circuit identifier 1004 is used at the egress to lookup the egress circuit state, get the outgoing VPI/VCI value, and perform appropriate traffic management functions (e.g., enqueuing, etc.). It should be noted that in this case, the backplane and the egress path treat the cell as any other cell to be sent out of this card.

2.b. Processing an LBF Cell at a Remote Card in Segment Loopback Where LLID is All 1's Referring back to step 1206, if PTI field 208 reports a 101 and the loopback indication field 702 in the arriving cell is set to 1, the ATM cell is an LBF cell. If the LLID 706 is all 1's, the Local_Segment_Sink_Indication bit 1106 of the circuit state of the connection that the ATM cell is in is set to 0 (as opposed to 1 as in 2.b. above), and the Remote_Segment_Sink_Indication 1110 is set to 0, the cell must be looped back at another card in the system that holds the segment endpoint.

The ingress card resets the loopback indication 702 to 0, sets the LLID 706 to the remote card ID, and re-computes the CRC-10 522 of the OAM cell. Alternatively, the remote card can do the OAM cell modification. The ingress card then wraps the cell with the system-internal header 1000, sets the egress connection identifier 1004 to the local egress connection identifier, the type 1002 to REMOTE_LOOPBACK_OAM, and the egress slot 1006 to the slot holding the remote line-card at which the loopback takes place. The cell is put on a fabric thread that leads to the egress slot. However, before the cell is sent, the cell type 1002 is examined. Since the cell type 1002 is REMOTE_LOOPBACK_OAM, the ingress line card replaces the egress slot with the ingress slot identifier and the cell is sent across the fabric to the remote card. The remote card, when it receives the cell, loopbacks the cell without any modification by putting it on the fabric thread towards the Slot_ID carried with the cell in the system-internal header. Now, the cell is an LBB cell and the cell will be switched towards the OAM source as any other cell.

2.c. Processing an LBF Cell in Segment Loopback Where LLID is Other Than All 1's Referring back to step 1206, if PTI field 208 reports a 101 and the loopback indication field 702 in the arriving cell is set to 1, the ATM cell is an LBF cell as discussed above. If the LLID 706 is all 0's and LLID_Option 1116 is enabled (set to 1), the cell is looped back at the ingress line card using the procedure described in 2.a. Alternatively, if LLID 706 is not all 1's or all 0's and LLID_option 1116 is enabled, the ingress card on which the cell is received from the network examines the LLID 706. It first compares the LLID 706 to the card ID. If the two match, the cell is looped back at ingress and the procedure is the same as described in 2.a. If they do not match, the LLID 706 is masked with the Node_ID_Mask and it is compared to the card_id masked with the Node_ID mask. If the two match, the cell must be looped back at the node at a remote card and the procedure is the same as that in 2.b. In this latter case, the remote Slot_ID is obtained by masking the LLID with the 1's complement of the Node_ID. Alternatively, a Slot_ID mask could be stored as well and used to mask the LLID. If there is no match, the cell is forwarded as any other cell.

2.d. Termination of an LBF Cell in Segment Loopback

If the cell is not terminated in 2.a., 2.b., or 2.c., and if Local_Segment_Source_Indication 1108, Remote_Segment_Source_Indication 1112, Local-Segment_Sink_Indication 1106, or Remote_Segment_Sink_Indication 1110 is set the cell is dropped because OAM cells are not supposed to cross segment boundaries.

2.e. Processing an LBB Cell in Segment Loopback

Referring back to step 1206, if PTI field 208 reports a 101 (indicating segment loopback) and the loopback indication field 702 in the arriving cell is set to 0, the ATM cell is an LBB cell. If Source_Option_Enabled 1124, extracted from the circuit state, is enabled (e.g., set to 1), the line card ID is matched to that of the source ID 708 in the arriving cell. If they match, the cell is captured to the control path or to the entity used to originate loopback OAM flows. If only the node ID matches, the OAM loopback cell must be captured at a remote slot in the connection path. The Slot_ID 1006 in the source header 1000 is checked to see if it corresponds to the egress Slot_ID in the circuit state. If they do not match, the cell is dropped. If they do match, the type 1002 in header 1000 is set to CAPTURE_LOOPBACK_CELL, the Slot_ID 1006 is set to the egress Slot_ID, and the connection_identifier 1004 is set to the egress connection identifier. The cell is captured to the entity in the system that originates loopback OAM flows for further processing (e.g., matching correlation ID). If the source ID 708 in the OAM cell does not match the Node_ID of the line card, and this is not a segment endpoint (e.g., Local_Segment_Source_Indication 1108, Remote_Segment_Source_Indication 1112, Local_Segment_Sink_Indication 1106 and Remote_Segment_Sink_Indication 1110 are set to 0), the cell is forwarded as any other cell. If the source ID 708 in the OAM cell does not match the Node_ID, and this is a segment endpoint, the cell is dropped.

Referring once again back to step 1206, if PTI field 208 reports a 101 (indicating segment loopback) and the loopback indication field 702 in the arriving cell is set to 0, the ATM cell is an LBB cell as discussed above. If Source_Option_Enabled 1124, extracted from the circuit state, is not enabled (e.g., set to 0), the source ID is not checked. The Local_Capture_Bit 1120 extracted from the circuit state is checked. If this bit is set to 1, the OAM cell is captured on the receiving line card for further analysis. Otherwise, if the remote capture bit 1122 is set, the type 1002 of header 1000 is set to CAPTURE_LOOPBACK_CELL, the Slot_ID 1006 to the egress Slot_ID, and the connection_identifier 1004 to the egress connection identifier. The cell is captured to the entity in the system that originates loopback OAM flows for further processing (e.g., matching correlation ID). If the cell is not to be captured at this node and this node does not contain the segment endpoint, the cell is forwarded as any other cell. If this node contains the segment endpoint but the cell is not captured, the cell is dropped.

Case 2: Connection is VPC.

OAM loopback processing for VPCs is similar to that of F4 and F5 flows for VCCs. The only difference is the detection of OAM cell flow. In the case of VPCs, the segment OAM flows have VCI 206 equal to 3 and end-end OAM flows have VCI 206 equal to 4.

A detailed method for how (i) augmented control state information for connections in a node, (ii) specialized fields in an internal header that is wrapped around ATM cells, and (iii) the assignment of network-wide unique logical identifiers can be used to remove any requirement of the use of line card 902 control blocks 304 in order to process OAM cells in a OAM loopback has been presented. However, the present invention is not limited to this detailed example. Indeed, the detailed example was provided merely to illustrate how the inventive techniques of the present invention can be implemented in order to achieve control block 304 independent loopback processing. Furthermore, any method, system, or apparatus that makes use of augmented control state information, specialized fields in internal line card headers wrapped around OAM cells, and/or the assignment of network-wide unique logical identifiers to line cards is within the scope of the present invention.

The illustrative descriptions of the application of the principles of the present invention are to enable any person skilled in the art to make or use the disclosed invention. Reference was made to Frame Relay and Multiple Protocol Label Switched (MPLS) connections, however the principals discussed herein are broadly application to any form of ATM network.

Figure 3:
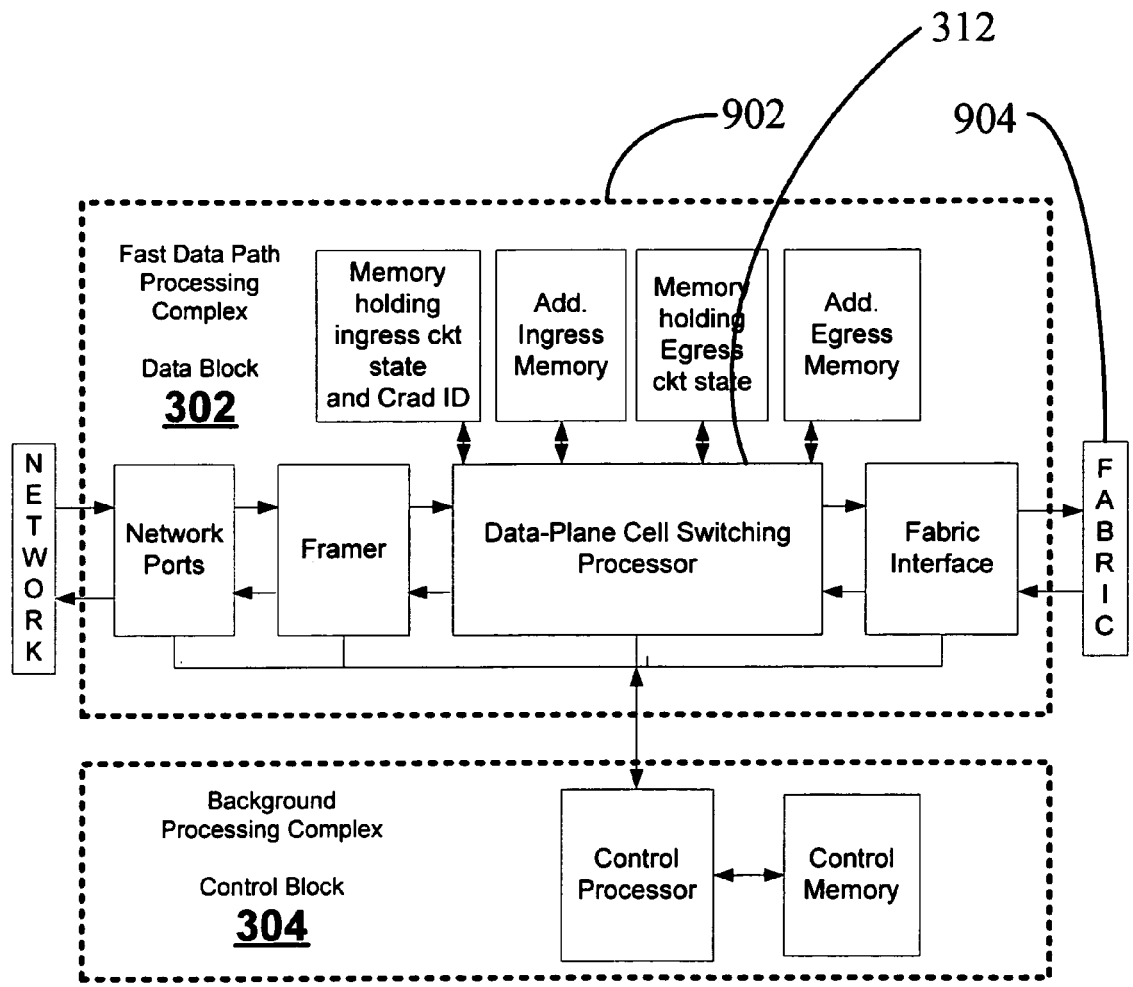
FIG. 3 illustrates an example of ATM line card architecture, including a data block (fast data path processing complex) and a control block (background processing complex) in accordance with the prior art.
Figure 4:
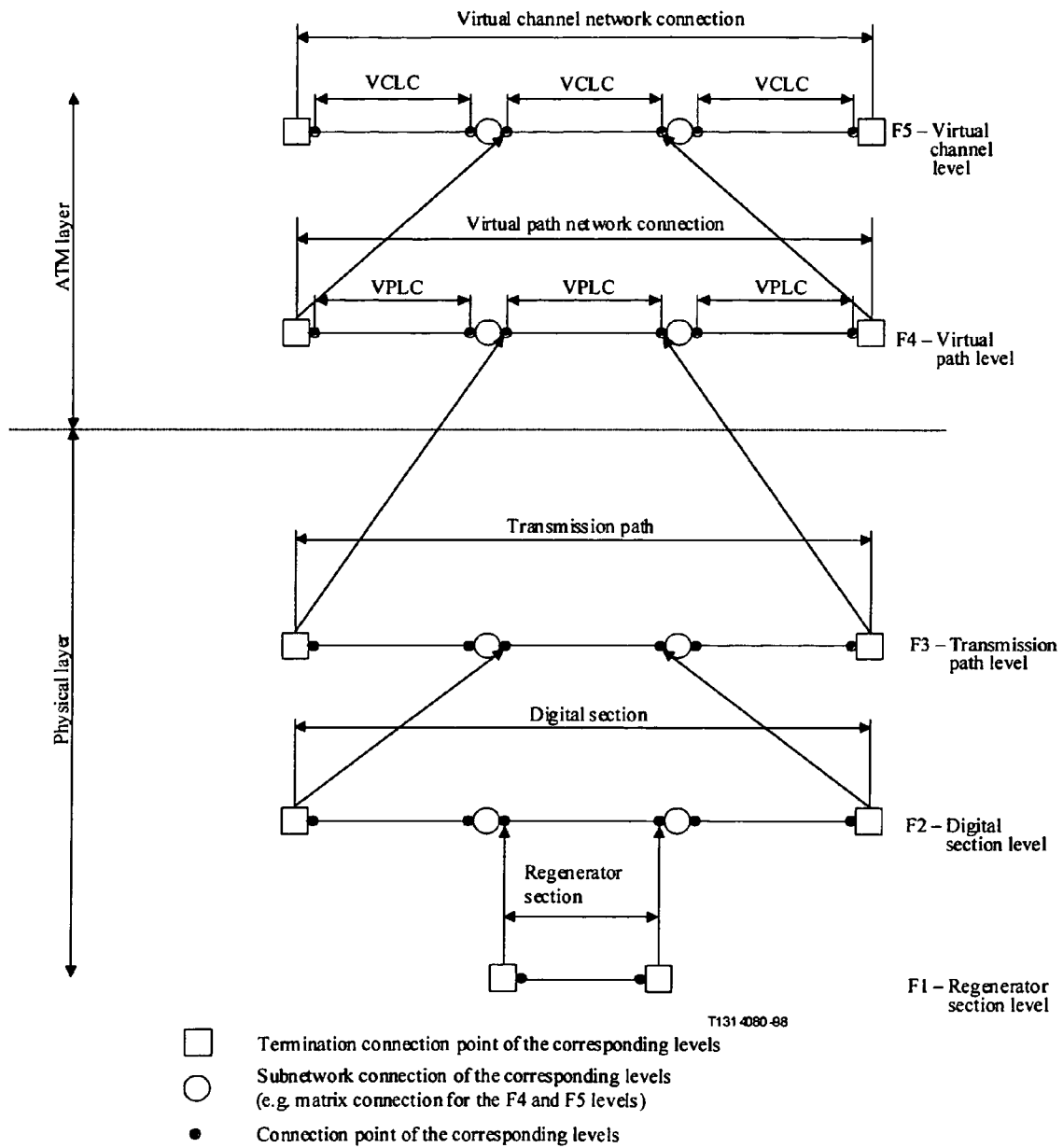
FIG. 4 illustrates F4 and F5 organization and maintenance (OAM) path levels in relation to the physical layer in accordance with the prior art.

To implement the methods of the present invention, certain modifications are made to the line card depicted in FIG. 3. First, additional circuit state information for each circuit in the ATM network is stored in memory associated with the data-plane cell switching processor 312. Second, each line card 902 is assigned a network unique identifier. This identifier can be stored, for example, in the processor 312 or in the memory associated with the processor. Third, the data-plane cell processor 312 is modified so that it can (i) read the augmented circuit state information, (ii) read the line card identifier and (iii) form the specialized header 1000 that is wrapped around ATM loopback cells before they are sent to the switch fabric, and (iv) interpret such specialized header 1000.

All references cited herein are incorporated by reference herein in their entirety. These descriptions are susceptible to numerous modifications and alternative arrangements by those skilled in the art. Such modifications and alternative arrangements are not intended to be outside the scope of the present invention. The appended claims are intended to cover such modifications and arrangements. Thus, the present invention should not be limited to the described illustrative embodiments but, instead, is to be accorded the broadest scope consistent with the principles and novel features disclosed herein.

We claim:

1. A line card in an ATM network for linking a source to a destination, the line card comprising:
   a data block that is in electrical communication with a control block; the data block comprising:
   a memory for storing circuit state information of a plurality of circuits in said ATM network, wherein, for each circuit in said plurality of circuits, said memory stores a loopback indication;
   a loopback detection module for detecting an operation administration and maintenance (OAM) cell and for determining which circuit in said plurality of circuits the OAM cell is testing; and
   a header creation module for wrapping a header around said OAM cell, said header including all or a portion of the loopback indication of the circuit in said plurality of circuits that the OAM cell is testing, including the direction of the OAM cell.

2. The line card of claim 1 wherein the circuit in the plurality of circuits that the OAM cell is testing is a virtual channel connection.

3. The line card of claim 1 wherein the circuit in the plurality of circuits that the OAM cell is testing is a virtual path connection.

4. The line card of claim 1 wherein the line card further includes a logical identifier that uniquely identifies the line card throughout said ATM network and wherein said logical identifier is used by said header creation module to provide said all or a portion of the loopback indication.

5. The line card of claim 4 wherein the logical identifier has the format node_ID.slot_ID where, node-ID is an identity of the switch in which the line card resides; and slot-ID is an identity of the line card.

6. The line card of claim 1 wherein said loopback detection module uses said loopback indication to determine whether said line card is a local endpoint for said OAM cell.

7. The line card of claim 1 wherein said ATM cell is an end-end loopback cell.

8. The line card of claim 1 wherein said ATM cell is part of an end-end F4 flow or an end-end F5 flow.

9. The line card of claim 1 wherein said ATM cell is part of a segment F4 flow or a segment F5 flow.

10. The line card of claim 1 wherein said all or a portion of the loopback indication includes a type field that indicates whether the line card is the loopback originator of the ATM cell.

11. The line card of claim 1 wherein said all or a portion of the loopback indication includes an egress slot identifier that identifies the egress line card to which the ATM cell should be routed.

12. A method of identifying a failure in a communication system at a predetermined line card or a round trip measurement at a predetermined line card, the method comprising:
   receiving an operation administration and maintenance (OAM) cell at a first line card in a switch in the communication system;
   determining whether said OAM cell is designated for loopback at the first line card in the switch or a remote line card in the switch; and
   when said OAM cell is designated for loopback at the first line card in the switch, the method further comprises:
      wrapping an internal header around said OAM cell, the internal header indicating the location of the first line card and a circuit identifier in the egress direction on the first line card if said OAM cell is to be looped back, and
   when said OAM cell is designated for loopback at a second line card in the switch, the method further comprises:
      wrapping an internal header around said OAM cell, the internal header indicating that the OAM cell is a remote loopback OAM cell, the internal 5 header further indicating an egress circuit identifier on the first line card and a slot identifier of the second line card and
      exchanging the slot identifier of the second line card with the identifier of the first line card before transmitting the OAM cell to a switch fabric.

13. The method of claim 12 wherein said OAM cell is in a virtual channel connection.

14. The method of claim 12 wherein said OAM cell is in a virtual path connection.

15. The method of claim 12, the method further comprising sending said OAM cell to a switch backplane associated with the ingress line card wrapped in said internal header.

16. The method of claim 12 wherein said OAM cell is part of an end-end F4 flow or an end-end F5 flow.

17. The method of claim 12 wherein said OAM cell is part of a segment F4 flow or a segment F5 flow.

18. A communication system comprising:
   (i) a plurality of sources;
   (ii) a plurality of destinations; and (iii) a plurality of nodes forming an asynchronous transfer mode (ATM) network connecting the sources to the destinations, each node in the plurality of nodes 30 including a plurality of line cards and each node in the plurality of nodes including:
 a forward path for receiving ATM cells in a forward direction toward a destination through the network,
 a return path for returning ATM cells in a reverse direction through the network toward a source,
said ATM network comprising a plurality of connections where, for each respective connection,
 one of said plurality of sources is linked to one of said plurality of destinations through said network by linking forward paths from one or more nodes, in said plurality of nodes, that is associated with the respective connection,
 said one of said plurality of destinations is linked to said one of said plurality of sources through said network by linking return paths from said one or more nodes that is associated with the respective connection, and wherein
said ATM network further comprises operation administration and maintenance (OAM) cell processing means for detecting a failure in a connection in said plurality of connections arising out of a failure of a node in the one or more nodes associated with the connection, wherein said OAM cell processing means detects said failure of said node without use of control blocks in the plurality of line cards associated with the plurality of nodes.

\* \* \* \* \*